United States Patent [19]

Lew

[11] Patent Number: 4,782,295
[45] Date of Patent: Nov. 1, 1988

[54] NUCLEAR MAGNETIC RESONANCE FLOWMETER

[76] Inventor: Hyok S. Lew, 7890 Oak St., Arvada, Colo. 80005

[21] Appl. No.: 56,001

[22] Filed: Jun. 1, 1987

[51] Int. Cl.$^4$ ............................................. G01R 33/20
[52] U.S. Cl. ..................................... 324/306; 128/653
[58] Field of Search ............... 324/300, 306, 307, 309, 324/318, 322; 128/653; 73/861.05, 861.06

[56] References Cited

U.S. PATENT DOCUMENTS

| | | | |
|---|---|---|---|
| 3,191,119 | 6/1965 | Singer | 324/306 |
| 3,419,793 | 12/1968 | Genthe | 324/306 |
| 3,551,794 | 12/1970 | Heyden | 324/306 |
| 3,562,632 | 2/1971 | Kirkland | 324/306 |
| 4,531,093 | 7/1985 | Rollwitz | 324/306 |
| 4,629,987 | 12/1986 | King | 324/306 |

Primary Examiner—Michael J. Tokar

[57] ABSTRACT

This invention discloses a flowmeter measuring flow rates by means of magnetic tagging, which comprises a flow passage through a constant magnetic field over a sizable length wherein the constant magnetic field is perpendicular to the direction of the fluid flow; a combination of a radio frequency transmitter and coil generating a localized alternating magnetic field perpendicular to the constant magnetic field and oscillating at a resonance frequency known as the Larmor frequency, which alternating magnetic field locally superimposed to the constant magnetic field over a short section of the flow passage is imposed in pulses at variable intervals; and a combination of an antenna coil and radio frequency receiver receiving and analyzing the peaks of radio frequency electromagnetic radiation pulses emitted by the fluid moving through the flow passage. The peaks of the electromagnetic radiation pulses from the fluid produced by the alternating magnetic field applied in pulses are directly related to the velocity of the fluid flow and, consequently, the fluid velocity is determined as a function of the peak values of the radio frequency radiation pulses from the moving fluid wherein the interval between the pulses is a parameter.

11 Claims, 3 Drawing Sheets

NUCLEAR MAGNETIC RESONANCE FLOWMETER

BACKGROUND OF THE INVENTION

The measurement of very low flow provides a real challenge in the flowmeter technology as many well known mechanical or electromagnetic principles employed in the design of the flowmeters become inoperative due to low magnitude in the effects thereof. At the present time, the very low flows are measured by the hot wire method or by a positive displacement pump. There are strong demands in chemical and pharmaceutical industries for a nonintrusive flowmeter that is capable of measuring fluid flows ranging from very low velocities to quite high velocity. The present day flowmeter technology does not have a nonintrusive flowmeter capable of measuring very low velocities of the fluid.

BRIEF SUMMARY OF THE INVENTION

The primary object of the present invention is to provide a nonintrusive flowmeter capable of measuring very low velocities as well as quite high velocities of fluid flow.

Another object is to provide a flowmeter capable of measuring blood flow in living bodies.

A further object is to provide a flowmeter that does not alter or influence the physical or chemical state of the fluid during flow measurement.

Yet another object is to provide a nuclear magnetic resonance flowmeter comprising a constant magnetic field perpendicular to the direction of the fluid flow provided by a permanent or direct current electromagnet, at least one alternating magnetic field perpendicular to the constant magnetic field oscillating at the Larmor frequency that is superimposed to the constant magnetic field in pulses at variable intervals, and a radio frequency receiver and analizer that measures the peak values of the radio frequency electromagnetic radiation pulses emitted from the moving fluid.

Yet a further object is to provide a nuclear magnetic resonance flowmeter that determines the fluid velocity from the peak values of the electromagnetic radiation pulses generated by a single series of alternating magnetic field applied in pulses.

Still another object is to provide a nuclear magnetic resonance flowmeter that determines the fluid velocity from two sets of peak values of the electromagnetic radiation pulses respectively generated by two different sets of alternating magnetic fields applied in pulses.

Still a further object is to provide a nuclear magnetic resonance flowmeter that determines the fluid velocity from three sets of peak values of the electromagnetic radiation pulses respectively generated by three different sets of alternating magnetic fields applied in pulses.

Additional object is to provide a nuclear magnetic resonance flowmeter that determines the fluid velocity by measuring magnetization of the fluid medium at at least two different sections in the constant magnetic field.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
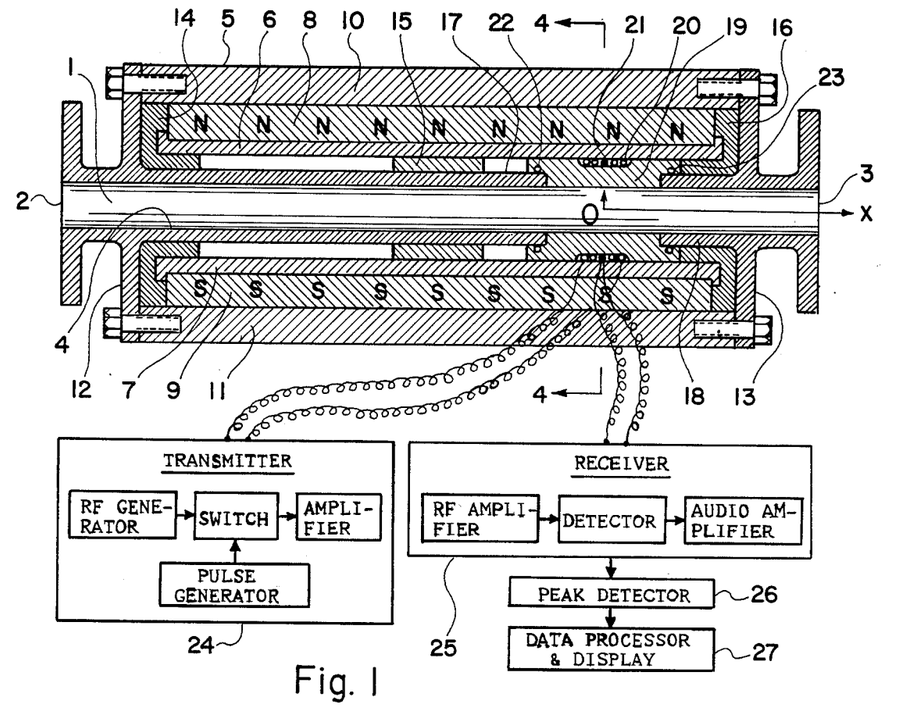
FIG. 1 illustrates a cross section of the nuclear magnetic resonance flowmeter constructed in accordance with the present invention.

In FIG. 1 there is illustrated a cross section of an embodiment of the nuclear magnetic resonance flowmeter constructed in accordance with the principles of the present invention, which cross section is taken along a plane including the central axis of the flow passage. The flow passage 1 extending from one extremity 2 to the other extremity 3 of the conduit 4 extends through a constant magnetic field generally perpendicular to the direction of the fluid flow, which constant magnetic field is provided by a magnet assembly 5 comprising a pair of pole face plates 6 and 7, a pair of permanent plate magnets 8 and 9, and flux path structures 10 and 11 connected to one another. The magnetic assembly 5 and the conduit 4 are packaged into one single integral assembly by means of two flanges 12 and 13 with fastening bolts and spacers 14, 15 and 16 made of a nonferromagnetic material. The conduit 4 providing the flow passage 1 is made of three sections; the two end sections 17 and 18 made of a nonferro-magnetic material such as stainless steel, bronze, plastic or glass, and the NMR (nuclear magnetic resonance) detector section 19 made of an electrically nonconducting diamagnetic material of zero parity such as fluoro carbon plastics, glass or ceramic material. The NMR detector section 19 includes a transmitter coil of a few turns 20 wound on the outside surface thereof and a receiver coil 21 of one or two turns wound on the outside surface of the NMR detector section 19 at the middle of the transmitter coil 20. The NMR detector section 19 is connected to the two end sections 17 and 18 in a leak proof arrangement that may include ring seals 22 and 23 or bonded coupling. The pole face plates 6 and 7 are plates with polished faces made of a high quality ferro-magnetic material such as silicon steel, which are employed to provide a uniform magnetic field intermediate the two pole faces of the magnetic over a sizable length in the direction of the fluid flow. The flux path structures including elements 10 and 11 are also made of a ferro-magnetic material. The transmitter coil 20 is energized by a transmitter 24 including a RF (radio frequency) generator, a switch controlled by a pulse generator and a RF amplifier, while the receiver coil 21 is connected to a receiver 25 comprising a RF amplifire, detector and audio amplifier. The peak detector 26 detects FID (free induction decay) peaks of electromagnetic radiation pulses emitted by the localized mass of moving fluid. The data processor and display 27 determines the fluid velocity by analizing the FID peaks and displays the information on the fluid velocity.

It is well known that a solid or fluid medium of diamagnetic material with a nonzero spin or nonzero parity placed in a constant magnetic field becomes magnetized in accordance with equation $$M = K_1 H_0^{3/2}(1 - e^{-t/T_1}) \tag{1}$$

where M is the magnetic moment density in the medium, $K_1$ is a constant of proportionality, $H_o$ is the flux density of the constant magnetic field, t is the time measured from the moment when the medium is placed in the constant magnetic field and $T_1$ is the spin-lattice relaxation time. It is not difficult to see that the time required for the fluid medium to travel from the upstream end of the constant magnetic field to the NMR detector section is given by equation $$t = L/U \tag{2}$$

where L is the distance between the upstream end of the ocnstant magnetic field and the NMR detector section and U is the fluid velocity. Substitution of equation (2) into equation (1) yields equation $$M = K_1 H_0^{3/2}(1 - e^{-L/UT_1}) \tag{3}$$

According to the theory of nuclear magnetic resonance, a diamagnetic medium of nonzero spin having a magnetic moment density M emits RF electromagnetic radiation oscillating at the Larmor frequency when that medium is energized by a pulse (such as a 90 degree pulse) of RF electromagnetic radiation oscillating at the Larmor frequency, wherein the emission of the RF electromagnetic radiation decays in accordance with equation $$V = K_2 M e^{-t/T_1} \tag{4}$$

where V is the emf associated with the RF emission; $K_2$ is a constant of proportionality and t is the time measured from the on-set of the RF emission. When equation (4) is substituted into equation (3), the following equation is obtained:

$$V = V_0(1 - e^{-L/UT_1})e^{t/T_1} \tag{5}$$

where $V_0 = K_1 K_2 H_0^{3/2}$. It should be mentioned that an antenna moving with the fluid will pick up the emf given by equation (5) when the localized fluid mass is energized by a 90 degree pulse of RF field provided by the stationary transmitter coil 20. According to experimental data, a stationary fluid medium next to a transmitter coil is energized by a pulse of RF field generated by the transmitter coil 20 in accordance with equation $$E = K_3 M e^{-x^2/A^2} \tag{6}$$

where E is the level of energizing, $K_3$ is a constant of proportionality, A is a characteristic length defining the length of the fluid column energized by the RF field and x is the distance measured from the central section of the transmitter coil. The relationship corresponding to equation (6) for a moving fluid medium can be readily obtained by substituting the material coordinate $(X - Ut)$ into x appearing in equation (6), which yields equation $$E = K_3 M e^{-(X - Ut)^2/A^2} \tag{7}$$

where X is the distance measured from the central section of the transmitter coil 20 where the receiver antenna is located and t is the time measured from the termination of the energizing pulse of RF field. The substitution of equation (3) into equation (7) and multiplying the term representing spin-lattice relaxation appearing in equation (4) thereto yields equation $$E = K_1 K_3 H_0^{3/2}(1 - e^{-L/UT_1})e^{-(X - Ut)^2/A^2}e^{-t/T_1} \tag{8}$$

It is not difficult to see that the emf induced in the receiver coil 21 generated by the RF emission resulting from the energizing of the fluid medium given by equation (8) is proportional to the energy level of the fluid mass next to the receiver coil 21 located at $X = 0$. Hence, the emf picked up by the receiver coil 21 is given by equation $$V = V_0(1 - e^{-L/UT_1})e^{-U^2t^2/A^2}e^{-t/T_1} \tag{9}$$

Figure 2A:
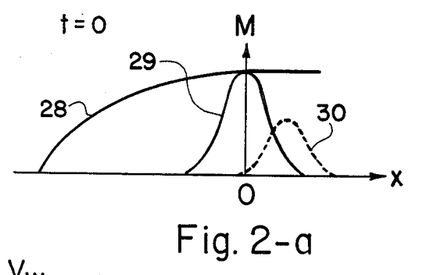
FIGS. 2a and 2b illustrate the magnetization of the moving fluid by the constant megnetic field and emission of the electromagnetic radiation from a localized fluid mass energized by a pulse of an alternating electromagnetic field oscillating at the Larmor frequency for two consecutive pulses, respectively.
Figure 2B:
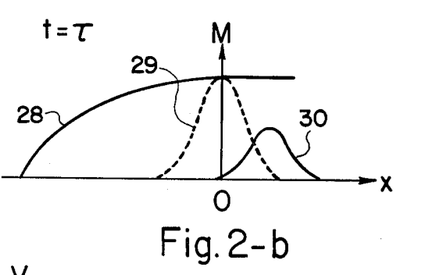

In FIGS. 2-a and b, there is illustrated the magnetization curve 28 describing equation (3), the energy level curves 29 and 30 respectively describing equation (8) for $t = 0$ and $t = \tau$. The theory of nuclear magnetic resonance points out that, firstly, the medium has to be magnetized by the constant magnetic field in order to be energized by a pulse of RF field provided by the transmitter coil 20 and, secondly, energizing by a pulse of RF field provided by the transmitter coil 20 demagnetizes the portion of the medium energized by the pulse of RF field. Therefore the very first pulse of RF field energizes the possible maximum fluid volume in the neighborhood of the transmitter coil 20 as indicated by the shaded area in FIG. 2-a, while a second pulse of RF field separated from the first pulse of RF field by a time interval $\tau$ energizes a fluid volume less than the possible maximum volume as indicated by the shaded area in FIG. 2-b because of the existence of demagnetized fluid volume under the curve 30 in the neighborhood of the transmitter coil 20 that was energized by the first pulse and is moving downstream away from the transmitter coil 20. This phenomenon can be better understood by examining equation (9), which describes the RF emission (output) generated by the first pulse of RF field (input). The term $(e^{-U^2 t^2/A^2} e^{-t/T_1})$ in equation (9) represents the energy level of the fluid volume in the neighborhood of the transmitter coil 20 and, consequently the level of demagnetization decaying due to convection and relaxation. Naturally, the term $(1 - e^{-U^2 t^2/A^2} e^{-t/T_1})$ represents the level of remagnetization. Hence, the second input pulse separated from the first input pulse by an interval $\tau$ generates an RF output with FID peak given by equation $$V_{PEAK} = V_0 (1 - e^{-L/UT_1})(1 - e^{-U^2 \tau^2/A^2} e^{-\tau/T_1}) \tag{10}$$

In general, equation (10) represents the FID peak generated by input pulses of time interval $\tau$. Equation (10) implies that: (1) The FID peak vanishes when the time interval $\tau$ between the input pulses is very small, (2) for a given value of $\tau$ of appropriate magnitude, the FID peak increases with increasing fluid velocity U, and (3) the FID peak becomes independent of U when $\tau$ is very large. What is implied by equation (10) can be explained by a simple reasoning based on common sense. The RF pulse applied by the transmitter coil 20 energizes the fluid volume in a neighborhood thereof by a rapid demagnetization process. The receiver coil 21 receives the RF electromagnetic emission released by the energized fluid volume in a neighborhood of the receiver coil 21 disposed in the middle of the transmitter coil 20, which RF electromagnetic emission is released from the energized fluid volume in the neighborhood of the transmitter-receiver coil combination during the deenergizing and remagnetizing process, which is a slow process compared to the energizing process. In order to be energized by the input RF pulse from the transmitter coil 20 and to emit the output RF emission, the fluid volume in the neighborhood of the transmitter-receiver coil combination must be at a magnetized state, which magnetization is produced by the constant magnetic field. When the input RF pulse is repeated rapidly at a very small time interval $\tau$, the fluid volume in the neighborhood of the transmitter-receiver coil combination remains demagnetized because of the demagnetizing effect of the input RF pulses and, consequently, there is no RF emission. When the input RF pulse is repeated at a very large time interval, the initial peak of the output RF emission (FID peak) becomes maximum independent of the numerical value of U as long as $\tau$ is sufficiently large, because the fluid volume becomes fully remagnetized during the interval $\tau$ and before each input RF pulse. From this observation, it is clear that the FID peak will increase from zero to the maximum value as the numerical value of $\tau$ increases in a certain range of $\tau$. When the fluid medium is moving, the remagnetization of the fluid volume in the neighborhood of the transmitter-receiver coil combination results from a combination of two different phenomena, which are, firstly, the remagnetization due to the nuclear magnetic relaxation phenomenon described by the preceding paragraphs and, secondly, due to the motion of the moving fluid that carries away the demagnetized fluid volume which is demagnetized by the preceding input RF pulse, and brings the magnetized fluid volume, which is magnetized by the constant magnetic field, into the neighborhood of the transmitter-receiver coil combination. For a stationary fluid medium, the FID peak is a monotonically increasing funciton of the time interval $\tau$ between the input RF pulses in a certain range of $\tau$. For a moving fluid, the FID peak is a monotonically increasing function of the fluid velocity U for an appropriate fixed value of $\tau$ in a certain range of the fluid velocity U. By employing different fixed values of $\tau$ for different subranges of the fluid velocity, a series of relationships between the FID peaks and the fluid velocities can be established. As a consequence, the fluid velocity U can be determined by measuring FID peaks. When the length L of the permanent magnet is significantly greater than the fluid velocity U times the spin-lattice relazation time $T_1$, equation (10) reduces to $$V_{PEAK} = V_0 (1 - e^{U^2 \tau^2/A^2} e^{-\tau/T_1}) \tag{11}$$

It should be mentioned that, firstly, the input RF pulse should be 90 degree pulse that generates the maximum output RF emission and, secondly, the input RF pulses having two different time intervals may include series of single pulse alternatively separated by two different time intervals.

Figure 3A:
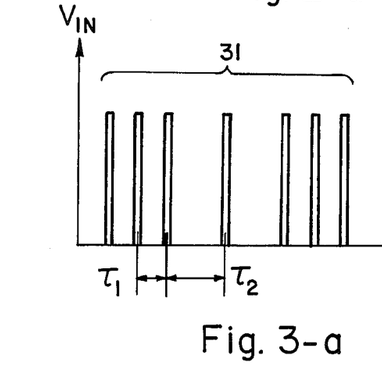
FIGS 3a and 3b illustrates input emf (electro-motiv force) pulses generating the pulsed alternating electro magnetic field and the output emf pulses generated thereby, respectively.
Figure 3B:
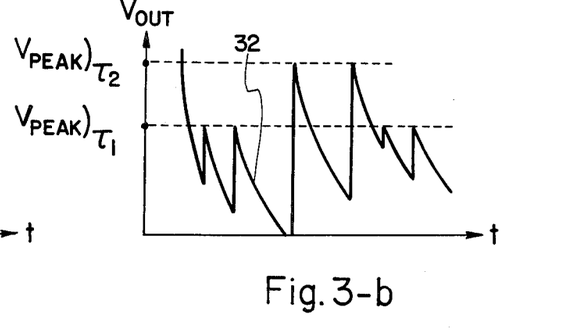

In FIGS. 3-a and b, there is illustrated two groups of input RF pulses 31 respectively applied at two different time intervals $\tau_1$ and $\tau_2$, wherein the two groups of the input RF pulses are alternated, and a series of output RF emission envelopes 32 generated by the input RF pulses. It follows from equation (10) or (11) that the ratio of the FID peaks respectively generated by the input RF pulses of two different time intervals $\tau_1$ and $\tau_2$ is given by equation $$\frac{V_{PEAK)\tau_2}}{V_{PEAK)\tau_1}} = \frac{1 - e^{-U^2 \tau_2^2/A^2} e^{-\tau_2/T_1}}{1 - e^{-U^2 \tau_1^2/A^2} e^{-\tau_1/T_1}} \tag{12}$$

When the characteristic constant A intrinsic to the flowmeter construction is determined empirically by the calibrating process of the flowmeter and the spin-lattice relaxation time $T_1$ is known for the fluid medium under the flow measurement, the fluid velocity U is determined as a function of the FID peak ratio in accordance with equation (12). If the spin-lattice relaxation time $T_1$ is unknown, the input RF pulse including three groups having three different time intervals $\tau_1$, $\tau_2$ and $\tau_3$ must be employed, which provides another FID peak ratio given by the following equation in addition to equation (12):

$$\frac{V_{PEAK)\tau_3}}{V_{PEAK)\tau_1}} = \frac{1 - e^{-U^2 \tau_3^2/A^2} e^{-\tau_3/T_1}}{1 - e^{-U^2 \tau_1^2/A^2} e^{-\tau_1/T_1}} \tag{13}$$

By solving equations (12) and (13) simultaneously, the unknown $T_1$ is eliminated and the fluid velocity U is determined as a function of the two FID peak ratios. It should be mentioned that the actual FID peak ratio may take the following form instead of the simplified theoretical expression given by equations (12) or (13):

$$\frac{V_{PEAK)\tau_n}}{V_{PEAK)\tau_m}} = \frac{1 - f\left(\frac{U\tau_n}{A}\right) e^{-\tau_n/T_1}}{1 - f\left(\frac{U\tau_m}{A}\right) e^{-\tau_m/T_1}}, \tag{14}$$

where $f(U\tau/A)$ is a monotinically decreasing function of $U\tau/A$, which function must be determined empirically by the calibration process of flowmeter. As mentioned earlier, optimum numerical values of $\tau_m$ and $\tau_n$ must be employed for each subrange of the fluid velocity U wherein the entire range of the fluid velicity U is made of the subranges. When the nuclear magnetic flowmeter of the present invention employs a long permanent magnet and the FID peak $V_0$ emitted by the stationary fluid medium is known, the fluid velocity U can be determined from FID peaks generated by input RF pulses applied at a single time interval $\tau$ from equation (11) or the following relationship written in the general form corresponding to equation (11):

$$\frac{V_{PEAK)\tau}}{V_0} = 1 - f\left(\frac{U\tau}{A}\right)e^{-\tau/T_1}. \qquad (15)$$

The most important principle taught by the present inveniton is the existence of the mathematical relationships between the FID peaks or ratios thereof and the fluid velocity for various fixed values of the time intervals appropriately taken for different fluid velocity ranges, which relationships provide basis for the design and operation of the nuclear magnetic resonance flowmeter.

Figure 4:
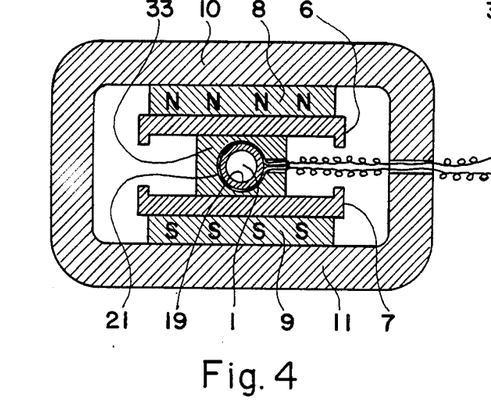
FIG. 4 illustrates another cross section of the embodiment shown in FIG. 1 showing a combination of the transmitter and receiver coils.

In FIG. 4 there is illustrated another cross section of the embodiment shown in FIG. 1, which cross section is taken along plane 4—4 as shown in FIG. 1. The receiver coil 21 has one or a few turns of coil wound around the midsection 19 of the conduit providing the flow passage 1. The transmitter coil comprises coils wound around the midsection 19 of the conduit over a length extending a short distance in both axial from the receiver coil 21. The pole face plates 6 and 7 produce a uniform constant magnetic field across the flow passage 1. The flux pass structures 10 and 11 constitutes a closed flux return pass, that enhances the intensity of the magnetic field across the flow passage 1. A spacer 33 made of a nonconducting paramagnetic material of zero parity may be included to secure the NMR detector section in place.

Figure 5:
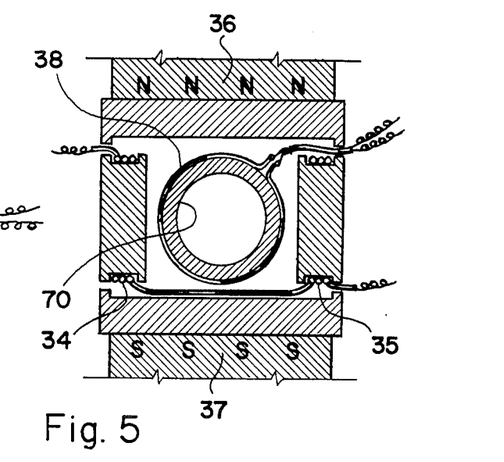
FIG. 5 illustrates another embodiment of the combination of the transmitter and receiver coils usable in conjunction with the present invention.

In FIG. 5 there is illustrated a cross section of another embodiment of the NMR detector section equivalent to that shown in FIG. 4, which may be employed in place of the embodiment shown in FIG. 4 in the construction of the NMR flowmeter of the present invention. The input RF pulse field is provided by a pair of transmitter coils 34 and 35 with central axis orthogonal to the constant magnetic field provided by the premanent magnet or direct current electromagnet 36 and 37 and to the central axis of the conduit 37, which pair of transmitter coils arranged in series sandwich the conduit 37. The receiver coil 38 is one or a few turns of coil with axis coinciding with the central axis of the conduit 37. This arrangement of the transmitter and receiver coils minimizes the leakage induction therebetween.

Figures 6, 7:
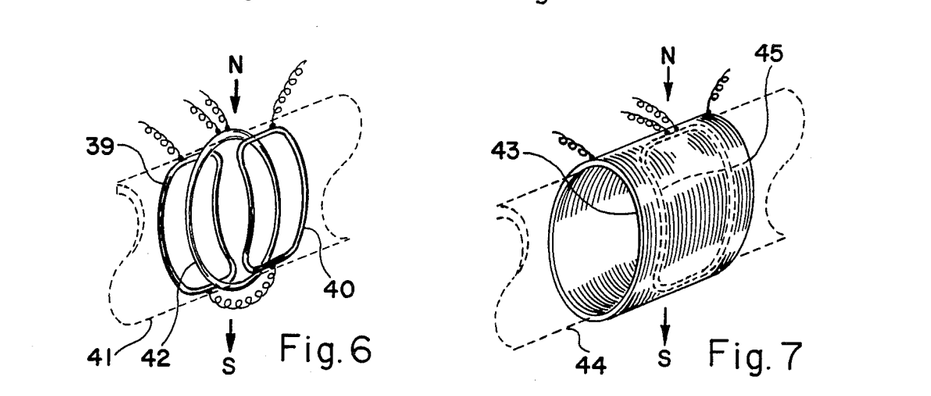
FIG. 6 illustrates a further combination of the transmitter and receiver coils.
FIG. 7 illustrates yet another combination of the transmitter and receiver coils.

In FIG. 6 there is illustrated a perspective view of a further embodiment of the NMR detector section that has essentially the same construction as the embodiment shown in FIG. 6. In this embodiment, the pair of the transmitter coils 39 and 40 arranged in series and sandwiching the conduit 41 hugs the outer wall of the conduit 41 including the receiver coil 42 wound around the outer wall of the conduit 41.

In FIG. 7 there is illustrated a perspective view of yet another embodiment of the NMR detector section, that includes a transmitter coil 43 wound on the outer wall of the conduit 44 providing the flow passage and a receiver coil 45 having an axis perpendicular to the constant magnetic field and to the central axis of the conduit 44, that is disposed intermediate the outer wall of the conduit 44 and transmitter coil 43. It should be mentioned that the switching system of the electronics can be arranged in such a way that a single coil having axis perpendicular to the constant magnetic field may provide dual functions as a transmitter coil and a receiver coil. Consequently, the NMR detector section employed in the NMR flowmeter of the present invention may include two different coils respectively functioning as a transmitter coil and a receiver coil, or a single coil having dual functions of transmitter and receiver coils.

Figure 8:
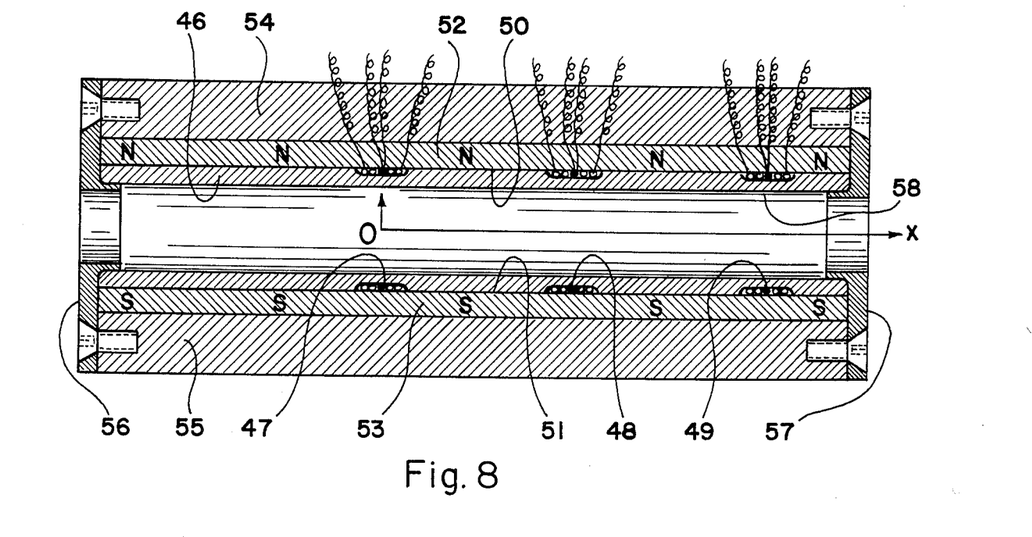
FIG. 8 illustrates a cross section of another embodiment of the present invention including multiple nuclear magnetic resonance measurement sections.

In FIG. 8 there is illustrated a cross section of another embodiment of the nuclear magnetic flowmeter of the present invention, which has essentially the same construction as the embodiment shown in FIG. 1 with a few exceptions. Instead of a conduit providing the flow passage, this embodiment includes a hollow tubing 46 made of a nonconducting diamagnetic magerial of zero parity, which includes three NMR detector sections 47, 48 and 49 distributed in the longthwise direction of the hollow tubing 46, which NMR detector sections may have constructions such as those shown in FIGS. 4, 5, 6 and 7. The combination of the hollow tubing 46 and the NMR detector sections 47, 48 and 49 are disposed intermediate the two opposing magnetic poles providing a constant magnetic field across the cross sections of the hollow tubing 46. The assembly of the magnet providing the constant magnetic filed comprises a pair of combinations of the pole face plate and magnet 52 and 53, and the flux pass structures 54 and 55, which elements are secured together by a pair of holder flanges 56 and 57. The flow conduit providing the flow passage for the fluid under the flow measurement, which is not shown in FIG. 8, extends through the holes 58 provided by the hollow tubing 46. Of course, the flow conduit must be made of a nonconducting diamagnetic material of zero parity.

The NMR flowmeter with multiple NMR detector sections such as the embodiment shown in FIG. 8 provides the following advantages: Firstly, the fluid velocity measurement per equations (12) and (13) or (14) requiring a multiple groups of the input RF pulses having different time intervals can be executed by using the multiple NMR detector sections wherein the input RF pulses of different time intervals are applied by different NMR detector sections instead of the single NMR detector section applying different group of the input RF pulses in alternating mode as described in conjunction with FIGS. 3-a and b. Secondly, the input RF pulses may employ the time intervals $\tau$ significantly greater than $A/U$ or $T_1$ appearing in equation (10). For such slow input RF pulses, equation (10) reduces to $$V_{PEAK} = V_0(1 - E^{-L/UT_1}) \qquad (16)$$

where L is the distance from the inlet section of the constant magnetic field to the NMR detector section. If the FID peak of the stationary fluid medium $V_0$ and the spin-lattice relaxation time $T_1$ is known, the fluid velocity U can be determined from equation (16) by using the FID peak generated by a slow input RF pulses, where the fluid velocity is determined from equation $$U = \frac{L/T_1}{\ln(V_{PEAK}/V_0 - 1)}, \tag{17}$$

where the characteristic distance L intrinsic to the flowmeter construction should be determined by the calibration process of the flowmeter. In determining the fluid velocity by equation (17), only one NMR detector section is required. When $V_0$ is unknown and $T_1$ is known, the fluid velocity U can be determined by the equation that results from equation (16)

$$\frac{V_{PEAK)L2}}{V_{PEAK)L1}} = \frac{1 - e^{-L_2/UT_1}}{1 - e^{-L_1/UT_1}}. \tag{18}$$

This method requires two NMR detector sections. If $V_0$ as well as $T_1$ is unknown, the fluid velocity U can be determined by simultaneously solving equation (18) and the following equation:

$$\frac{V_{PEAK)L3}}{V_{PEAK)L1}} = \frac{1 - e^{-L_3/UT_1}}{1 - e^{-L_1/UT_1}}. \tag{19}$$

This mode of NMR flowmeter requires three NMR detector sections disposed in series. It should be mentioned that in order to measure the fluid velocity by the methods described in conjunction with equations (17), (18) and (19), $L_1$, $L_2$ and $L_3$ must be comparable to ($UT_1$) in magnitude. Therefore, it is desirable to make $L_1$, $L_2$ and $L_3$ variable, whereby $L_1$, $L_2$ and $L_3$ can be adjusted for different ranges of fluid velocity. By making the permanent magnet and/or the NMR detector sections slidable in the direction of the fluid flow, $L_1$, $L_2$ and $L_3$ can be varied to appropriate values required to measure the fluid velocities in different ranges.

Figure 9:
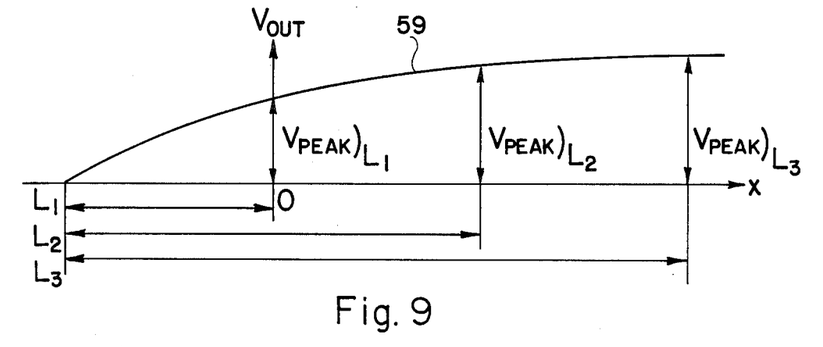
FIG. 9 illustrates magnetization of the moving fluid by the constant magnetic field at different nuclear magnetic resonance measurement sections.

In FIG. 9 there is illustrated the curve 59 repersenting equation 16, which is proportional to the magnetization of the fluid medium moving through the constant magnetic field. The FID peaks of the RF emission respectively measured at two or three different NMR detector sections provide the FID peak ratio given by equations (18) and/or (19).

Figure 10A:
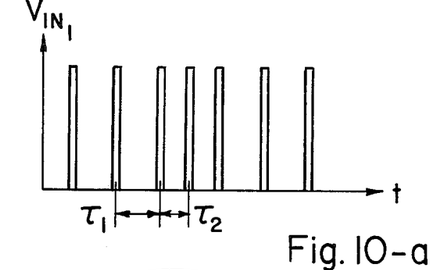
FIGS. 10a and 10b illustrate two series of input emf pulses which generate three sets of peak values of the output emf pulses respectively generated by input emf pulses having three different intervals.
Figure 10B:
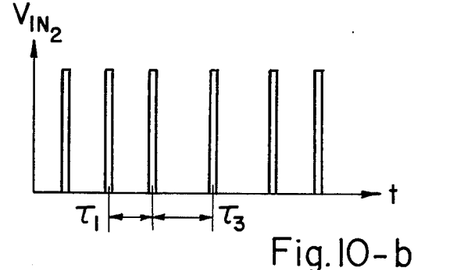

In FIGS. 10-a and b, there is illustrated a novel method for generating FID peak ratios involving three different time intervals by using two different NMR detector sections. Each of the two NMR detector sections applies two groups of input RF pulses having two different time intervals wherein one time interval $\tau_1$ is common to both NMR detector sections. As a consequence, the two NMR detector sections respectively provide the FID peak ratios given by equations (12) and (13), which ratios can be used directly to determine the fluid velocity without requiring any correlation therebetween.

Figures 11, 12, 13:
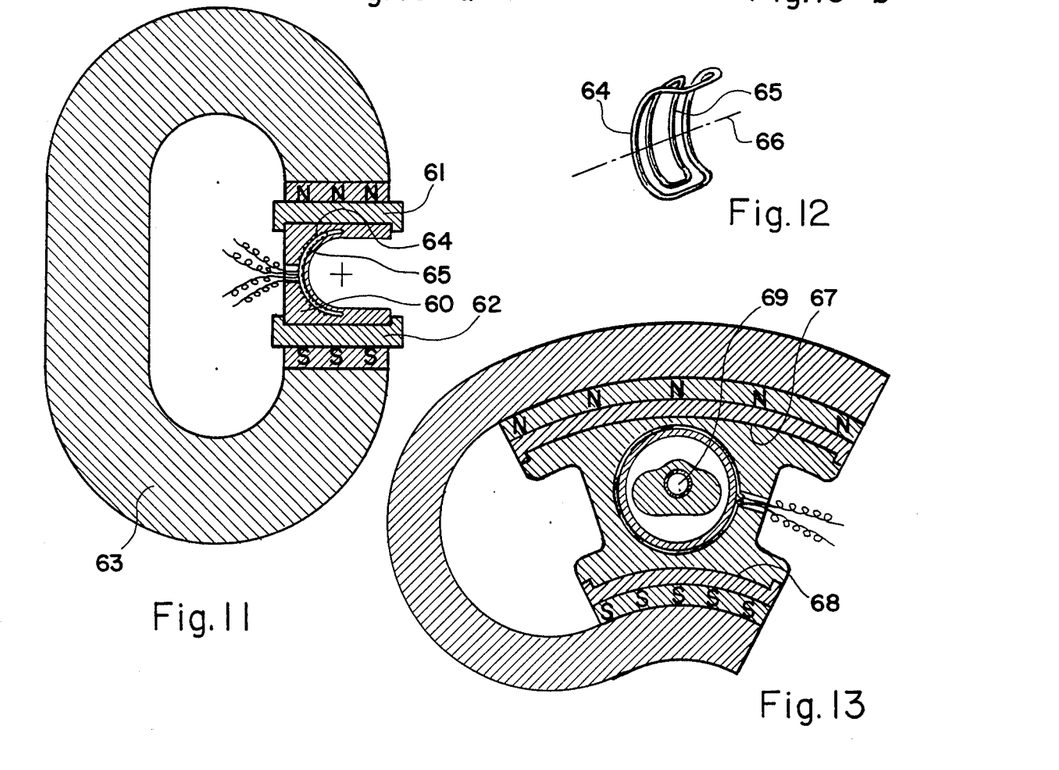
FIG. 11 illustrates a cross section of a further embodiment of the present invention.
FIG. 12 illustrates a perspective view of the combination of the transmitter and receiver coils employed in the embodiment shown in FIG. 11.
FIG. 13 illustrates a cross section of a further embodiment of the nuclear magnetic resonance flowmeter of the present invention.

In FIG. 11 there is illustrated a cross section of a further embodiment of the nuclear magnetic resonance flowmeter of the present invention, that has a side opening for receiving a conduit providing the flow passage. The spacer 60 disposed intermediate two long magnetic pole faces 61 and 62 of a C-magnet 63 has a longitudinal groove having a U-shaped cross section. The combination of the transmitter coil 64 and receiver coil 65 having a saddle-shaped arrangement provides an unobstructed side opening.

In FIG. 12 there is illustrated a perspective view of the isolated transmitter coil 64 and receiver coil 65 having a coaxial arrangement disposed on a generally semicircular cylindrical surface hugging the bottom of the V-shaped groove, which surface has an axis of radius 66 parallel to the direction of the fluid flow.

In FIG. 13 there is illustrated a cross section of yet another embodiment of the nuclear magnetic resonance flowmeter of the present invention, that employs a constrant radial magnetic field perpendicular to the direction of the fluid flow, which is provided by a pair of magnetic pole faces 67 and 68 of circular cylindrical shapes arranged in a concentric relationship. The magnetic flux density of the constant magnetic field varies inversely proportional to the radial distance from the concentric axis of the two magnetic pole faces 67 and 68. The Larmor frequency is directly proportional to the magnetic flux density of the constant magnetic field. The input RF pulse of a particular Larmor frequency energizes the fluid medium occupying a region wherein the magnetic flux density is equal to the exact value corresponding to that Larmor frequency within ±0.5 percent deviation. The constant radial magnetic field or transversely varying constant magnetic field enables one to selectively energize the fluid medium moving through a flow passage surrounded by a large mass of material that also emits NMR output emission at the same RF frequency as the fluid medium, wherein the Larmor frequency corresponding to the magnetic flux density at the location of the flow passage 69 is selectively employed in obtaining the FID peak values.

The nuclear magnetic resonance flowmeter of the present invention has a particularly promising application in measuring blood flows in living body. The difficulty involved in the measurement of the blood flow in living body originates from the fact that the blood as well as the surrounding tissues emits NMR emissions which are indistinguishable. The total FID peak is the sum of RF emissions from the moving blood and stationary surrounding tissues, which is given by the right-hand-side of equation (10) plus the RF emission from the stationary tissues $$V_{PEAK} = V_0)_B(1 - e^{-L/UT_1})(1 - e^{-U^2 2/A^2}e^{-/T_1}) + \tag{20}$$

$$V_0)_T(1 - e^{-/T_1}).$$

The nuclear magnetic resonance blood flowmeter must have means for varying L appearing in equation (20) from a small value $L_1$ to a sizably large value $L_2$. For the small value $L_1$ and a large value of $\tau$, equation reduces to $$V_{PEAK)L1} = V_0)_T \tag{21}$$

Substitution of equation (21) to equation (20) and rearrangement yields equation $$\frac{V_{PEAK}}{1 - e^{-\tau/T_1}} - V_{PEAK)L1} = \tag{22}$$

$$\frac{V_0)_B}{1 - e^{-\tau/T_1}} (1 - e^{-L/UT_1})(1 - e^{-U^2\tau^2/A^2}e^{-\tau/T_1}).$$

The first term in the right-hand-side of equation (22) is the normalized FID peak, which is the FID peak divided by the percent remagnetization taking place in a time interval of $\tau$. It results from equation (22) that $$\frac{V_{PEAK})_{\tau_2}/(1 - e^{-\tau_2/T_1}) - V_{PEAK})_{L_1}}{V_{PEAK})_{\tau_1}/(1 - e^{-\tau_1/T_1}) - V_{PEAK})_{L_1}} = \qquad (23)$$

$$\frac{(1 - e^{-\tau_1/T_1})(1 - e^{-U^2\tau_2^2/A^2}e^{-\tau_2/T_1})}{(1 - e^{-\tau_2/T_1})(1 - e^{-U^2\tau_1^2/A^2}e^{-\tau_1/T_1})}$$

where $V_{PEAK})_{\tau_i}$ is the FID peak generated with large value $L_2$ and the time interval $\tau_i$. The characteristic constant A is a constant intrinsic to the flowmeter and, consequently, is determined by the calibration process of the flowmeter. The spin-lattice relaxation time $T_1$ of the blood is determined empirically. The only unknown in equation (23) is the velocity U of the blood flow and, consequently, equation (23) can be solved for U. The operation of the nuclear magnetic resonance blood flow meter with a single NMR detector section comprises the following procedures: Firstly, one obtains the FID peak $F_{PEAK})_{L_1}$ with the NMR detector section positioned at a small distance $L_1$ from the upstream extremity of the constant magnetic field. Secondly, one obtains two FID peak values with two different time intervals $\tau_1$ and $\tau_2$ after positioning the NMR detector section at a large distance $L_2$ away from the upstream extremity of the constant magnetic field. In doing so, the measurement of the two FID peaks repectively corresponding to the two different time intervals $\tau_1$ and $\tau_2$ must be timed identically with respect to the cardiac pulse. Thirdly, one substitutes the aforementioned three different FID peaks into equation (23) and solve for the blood velocity U, which gives the numerical value of the blood velocity at the particular timing with respect to the cardiac pulse. It should be mentioned that, in measuring the blood flow as well as measuring flows of other fluid media, the measured FID peaks may be entered into an empirical equation relating the fluid velocity to the measured FID peaks instead of the theoretical equations shown in this specification of the invention. Of course, the three different FID peaks appearing in the left-hand-side of equation (23) may be measured simultaneously by three different NMR detector sections located at appropriate positions relative to the upstream extremity of the constant magnetic field. There is another way to eliminate the NMR emmission from the stationary tissues surrounding a blood stream. It follows equation (20) that $$\frac{\frac{V_{PEAK})_{\tau_2}}{1 - e^{-\tau_2/T_1}} - \frac{V_{PEAK})_{\tau_1}}{1 - e^{-\tau_1/T_1}}}{\frac{V_{PEAK})_{\tau_3}}{1 - e^{-\tau_3/T_1}} - \frac{V_{PEAK})_{\tau_1}}{1 - e^{-\tau_1/T_1}}} = \qquad (24)$$

$$\frac{\frac{1 - e^{-U^2\tau_2^2/A^2}e^{-\tau_2/T_1}}{1 - e^{-\tau_2/T_1}} - \frac{1 - e^{-U^2\tau_1^2/A^2}e^{-\tau_1/T_1}}{1 - e^{-\tau_1/T_1}}}{\frac{1 - e^{-U^2\tau_3^2/A^2}e^{-\tau_3/T_1}}{1 - e^{-\tau_3/T_1}} - \frac{1 - e^{U^2\tau_1^2/A^2}e^{-\tau_1/T_1}}{1 - e^{-\tau_1/T_1}}}$$

The three different FID peaks respectively associated with three different time intervals can be measured by a single NMR detector section included in a NMR blood flow meter at identical timing with respect to the cardiac pulse. When the measured values of the three FID peaks are substituted into equation (24), the blood flow velocity U results therefrom.

It must be mentioned that, according to the principles taught by the present invention, a nuclear magnetic resonance image will predominantly show blood streams in a living body when the alternating magnetic field energizing the blood as well as the tissues is applied in a series of 90 degree pulses with time interval between two consecutive pulses much smaller than the spin-lattice relaxation time, for stationary medium emits little NMR emission under such a rapidly pulsed alternating magnetic field that keeps the stationary medium constantly exposed thereto at a demagnetized state by continuously scrambling the nuclear magnetrons in the stationary medium. The moving medium magnetized by the constant magnetic field and freshly moving into the localized alternating magnetic field emits a strong NMR emission immediately after hit by the first 90 degree pulse and before the ensueing demagnetization. As a consequence, a moving stream of fluid medium or solid medium continuously emits a strong NMR emission independent of the demagnetizing effect of the 90 degree pulses applied in a rapid sequence. Of course, the intensity of the NMR emission from the moving medium increases monotonically with the increasing velocity, when an appropriate value of the time interval between two consecutive 90 degree pulses is employed, which principle underscores the operating principles of the present invention. Therefore, it is clear that the present invention also teaches how to construct a nuclear magnetic resonance imaging method and device that predominantly shows the blood streams in the living body in contrast to the blanked out back ground.

While the principles of the present invention have now been made clear by the illustrative embodiments, it will be immediately obvious to those skilled in the art many modifications of the structures, arrangements, proportions, elements and materials, which are particularly adapted to the specific working environments and operating conditions in the practice of the invention without departing from those principles.

I claim:

1. An apparatus for measuring fluid flow comprising in combination:

(a) a magnet providing a generally constant magnetic field in a region having a sizable lengthwise dimension, wherein magnetic fluxes in said magnetic field are generally perpendicular to a longitudinal axis parallel to said lengthwise dimension;

(b) an elongated conduit disposed in said magnetic field, said elongated conduit including a flow passage generally parallel to said longitudinal axis;

(c) a combination of a transmitter coil and a receiver antenna disposed at one section of said elongated conduit within said magnetic field for producing a localized alternating magnetic field generally perpendicular to said constant magnetic field and for receiving electromagnetic emission emitted by a localized fluid mass contained in said conduit, which is energized by said localized alternating magnetic field;

(d) an electronic transmitter for energizing said transmitter coil with a series of pulsed alternating currents oscillating at a nuclear magnetic resonance frequency of the fluid in said conduit, said electronic transmitter including a pulse control means for controlling value of time interval between pulses of said alternating currents, wherein the pulsed alternating currents with a controlled value of the time interval generate a series of pulsed electromagnetic emissions with peak values increasing with increasing fluid velocity; and (e) an electronic receiver for detecting said peak values of the series of pulsed electromagnetic emissions as a measure of the fluid velocity.

2. The combination as set forth in claim 1 wherein said electronic transmitter transmits said pulsed alternating currents with a fixed value of the time interval, wherein the fluid velocity is determined from the peak values of pulsed electromagnetic emissions generated by said pulsed alternating currents with the fixed value of the time interval.

3. The combination as set forth in claim 1 wherein said electronic transmitter transmits said pulsed alternating currents with two mixed values of the time interval, wherein the fluid velocity is determined from ratio of two peak values of pulsed electromagnetic emissions respectively generated by two sets of pulsed alternating currents respectively having said two mixed values of the time interval.

4. The combination as set forth in claim 1 wherein said electronic transmitter transmits said pulsed alternating currents with three mixed values of the time interval, wherein the fluid velocity is determined from two different ratios of peak values obtained from three peak values of pulsed electromagnetic emissions respectively generated by three sets of pulsed alternating currents respectively having said three mixed values of the time interval.

5. The combination as set forth in claim 1 wherein said electronic transmitter transmits said pulsed alternating currents with three mixed values of the time interval, wherein the fluid velocity is determined from ratio of the difference between a first normalized peak value and a second normalized peak value to the difference between said second normalized peak value and a third normalized peak value, wherein said first, second and third normalized peak values are respectively equal to three peak values of pulsed electromagnetic emissions respectively generated by three sets of pulsed alternating currents respectively having said three mixed values of the time interval and divided by percent remagnetization taking place during each of said three mixed values of the time interval.

6. An apparatus for measuring fluid flow comprising in combination:
(a) a magnet providing a generally constant magnetic field in a region having a sizable lengthwise dimension, wherein magnetic fluxes in said magnetic field are generally perpendicular to a longitudinal axis parallel to said lengthwise dimension;
(b) an elongated conduit disposed in said magnetic field, said elongated conduit including a flow passage generally parallel to said longitudinal axis;
(c) at least two combinations of a transmitter coil and a receiver antenna respectively disposed at two different cross sections of said elongated conduit within said magnetic field for producing two separate localized alternating magnetic fields generally perpendicular to said constant magnetic field and for receiving two different electromagnetic emissions repectively emitted by two localized fluid masses contained in said conduit, which are respectively energized by said two separate localized alternating magnetic fields;
(d) electronic transmitter for energizing said two transmitter coils with two different series of pulsed alternating currents oscillating at a nuclear magnetic resonance frequency of the fluid in said conduit, said electronic transmitter including pulse control means for controlling value of time interval between pulses of said alternating currents in said two different series of pulsed alternating currents, wherein each of said two differennt series of alternating currents with a controlled value of the time interval generate a series of pulsed electromagnetic emissions with peak values increasing with increasing fluid velocity; and
(e) electronic receiver for detecting said peak values of the series of pulsed electromagnetic emissions as a measure of the fluid velocity.

7. The combination as set forth in claim 6 wherein said electronic transmitter transmits each of said two series of pulsed alternating currents with a fixed value of time interval, wherein the fluid velocity is determined from at least one sets of the peak values of two series of pulsed electromagnetic emissions respectively generated by said two series of pulsed alternating currents with the fixed value of the time interval.

8. The combination as set forth in claim 6 wherein said electronic transmitter transmits the two different series of pulsed alternating currents with two different fixed values of the time interval, wherein the fluid velocity is determined from ratio of two peak values of pulsed electromagnetic emissions repectively generated by the two different series of pulsed alternating currents.

9. The combination as set forth in claim 6 wherein said electronic transmitter transmits each of said two series of pulsed alternating currents with two mixed values of the time interval, one of said two mixed values of the time interval being common to the two series of pulsed alternating currents, wherein the fluid velocity is determined from two different ratios of peak values obtained from three peak values of pulsed electromagnetic emissions respectively generated by three sets of pulsed alternating currents respectively having said three different mixed values of the time interval.

10. An apparatus for measuring fluid flow comprising in combination:
(a) a magnet providing a generally constant magnetic field in a region having a sizable lengthwise dimension, wherein magnetic fluxes in said magnetic field are generally perpendicular to a longitudinal axis parallel to said lengthwise dimension;
(b) an elongated conduit disposed in said magnetic field, said elongated conduit including a flow passage generally parallel to said longitudinal axis;
(c) a combination of a transmitter coil and a receiver antenna disposed at a close proximity to said elongated conduit within said magnetic field in a movable arrangement in a direction parallel to said longitudinal axis for producing a localized alternating magnetic field generally perpendicular to said constant magnetic field and for receiving electromagnetic emission emitted by a localized fluid mass contained in said conduit, which is energized by said localized alternating magnetic field, wherein said combination positioned at an upstream extremity of said magnetic field energizes stationary medium only, while said combination positioned at a section of said conduit well within said magnetic field energizes stationary medium and moving medium;
(d) an electronic transmitter for energizing said transmitter coil with a series of pulsed alternating currents oscillating at a nuclear magnetic resonance frequency of media within said magnetic field, said electronic transmitter including a pulse control means for controlling value of time interval between pulses of said alternating currents, wherein the pulsed alternating currents with a controlled value of the time interval generate a series of pulsed electromagnetic emissions with peak values increasing with increasing medium velocity; and (e) an electronic receiver for detecting said peak values of the series of pulsed electromagnetic emissions as a measure of the fluid velocity.

11. The combination as set forth in claim 10 wherein said electronic transmitter transmits said pulsed alternating currents with two mixed values of the time interval, wherein the fluid velocity is determined from ratio of the difference between two normalized peak values generated and detected by said combination of transmitter coil and receiver antenna respectively positioned at two different cross sections of said conduit under transmission with one of said two mixed values of the time interval to the difference between two normalized peak values generated and detected by said combination of transmitter coil and receiver antenna respectively positioned at two different cross sections of said conduit under transmission with the other of said two mixed values of the time interval, wherein the normalized peak value is defined as a peak value divided by percent remagnetization taking place during the time interval between pulses of the alternating currents generating said peak value.

* * * * *